March 5, 1963   J. B. BAKER   3,080,009
DRILL BIT

Filed Feb. 27, 1959   2 Sheets-Sheet 1

INVENTOR:
JOHN B. BAKER

By Gravely, Lieder & Woodruff
ATTORNEYS.

March 5, 1963   J. B. BAKER   3,080,009
DRILL BIT

Filed Feb. 27, 1959   2 Sheets-Sheet 2

INVENTOR:
JOHN B. BAKER
BY Gravely, Lieder & Woodruff
ATTORNEYS.

United States Patent Office 3,080,009
Patented Mar. 5, 1963

3,080,009
DRILL BIT
John B. Baker, Canton, Ohio, assignor to The Timken Roller Bearing Company, Canton, Ohio, a corporation of Ohio
Filed Feb. 27, 1959, Ser. No. 795,954
3 Claims. (Cl. 175—410)

The present invention relates generally to drill bits and more particularly to drill bits having one or more cutting inserts.

It is well known to make drill bits with cutting inserts which are formed having zones of different hardness. The known inserts, however, have been formed by attaching several different and distinct elements of different hardness materials together and then attaching the resulting insert to the body of a rock drill bit. In the known devices the several different hardness materials simultaneously contact the material being drilled and their different hardness characteristics cause uneven wear of the materials and fractures. Furthermore, the known devices are disadvantageous to use because they have distinct fracture zones formed where the materials of different hardness meet including the zone between the insert and the drill bit proper. For these and other reasons the known constructions have been unsatisfactory and have required relatively more frequent regrinding and replacement with incident relatively higher drilling costs.

The present invention overcomes these and other disadvantages of the known devices by providing an insert formed of several materials of different hardness which are fused together during the forming process by a sintering operation so that there are no distinct fracture zones between materials, and if desired, the insert can also be fused to the drill bit, thereby also eliminating the formation of distinct fracture zones therebetween also. By so providing, the present insert and bit construction incorporate the desirable characteristics of all of the different materials used and also greatly reduced the chance of fracture. Furthermore, the usable life of a drill bit having inserts constructed according to this invention is substantially increased because only the most wear resistant material is in contact with the surface being drilled during a substantial portion of the life of the insert and this portion of the drill life encompasses the period in which maximum cutting efficiency takes place. The present device also reduces the regrinding and maintenance cost of drilling.

It is therefore a principal object of the present invention to increase the life of drill bits.

Another object is to minimize the chance of fractures in drill bits and drill bit inserts.

Another object is to provide an insert for a drill bit constructed of materials having different hardness characteristics, which insert has only one of the materials thereof in contact with a surface being drilled during a substantial portion of its life.

Another object is to provide an insert constructed by fusing together several materials having different hardness characteristics, said insert having predominantly wear resistant characteristics exposed on the working surfaces thereof.

Another object is to reduce the maintenance costs of rock drills.

Still another object is to provide an insert which incorporates the desirable characteristics of several different materials.

The present device consists of an insert adapted to be installed on or fused to the body of a drill bit, said insert being formed by fusing several materials having different hardness and wear characteristics together so that during the initial stages of a drill operation only one of the materials is exposed to the surface being drilled.

These and other objects and advantages of the present invention will become apparent after considering the following detailed specification in conjunction with the accompanying drawing, wherein:

FIG. 1 is a side elevational view of an insert for a drill bit constructed according to the teachings of the present invention, FIG. 2 is a right end view of the insert of FIG. 1, FIG. 3 is a sectional view taken on line 3—3 of FIG. 1, FIG. 4 is a sectional view taken on line 4—4 of FIG. 2, FIG. 5 is a side view, partly cut away and sectioned for clarity, showing a modified form of the present insert construction installed on a drill bit, FIG. 6 is a side view of a drill bit having inserts constructed according to this invention.

Figure 1:
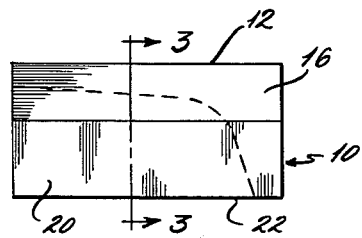
Figure 2:
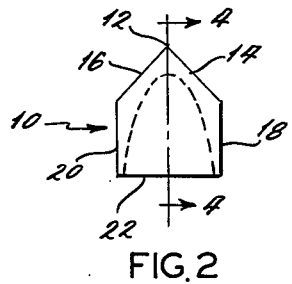
Figure 3:
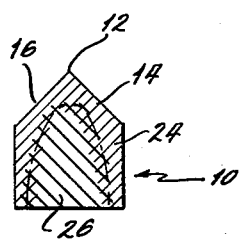
Figure 4:
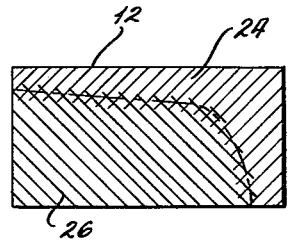

Referring now to the drawing in detail and by reference numbers, the number 10 identifies generally an insert for a drill bit, such as a rock drill bit, which is constructed according to the teachings of the present invention. The insert 10 has a cutting edge 12 defined at the juncture of two adjacent sloping cutting surfaces 14 and 16. The body of the insert, for illustrative purposes, is shown as having spaced side surfaces 18 and 20 and a bottom surface 22. The shape of the insert is not critical but can be varied depending upon the particular bit on which it is used and also on the mounting provided therefor on the bit.

The insert 10 is formed of two different materials having different hardness and wear resistant characteristics which are fused or sintered together. In the drawing, two layers of different hardness materials are shown, an outer layer, identified by number 24, being formed of material which has predominantly wear resistant characteristics, such as wear grade tungsten carbide, and an inner layer, identified by number 26, which is formed substantially within the outer layer and has shock resistant tungsten carbide. Shock resistant tungsten carbide, like wear resistant tungsten carbide is very hard but is less hard than the wear resistant carbide.

The actual construction of the insert may take place in any desired way such as by molding. When a mold is used the mold cavity is filled with the several grades of tungsten carbide material in powder form. The wear grade material 24 which forms the outer layer is first poured into the mold and distributed in the desired pattern such as the pattern shown in the drawing. The inner layer is then formed by filling the mold cavity with the shock material 26, also in powder form. Next, the mold is closed and heat and pressure applied until the two grades are sintered together to form the completed insert. A binder material (not shown) is also present in the carbides to hold the carbide particles together. The usual binder is cobalt. During the sintering operation some interchange of the binder takes place between the different powder mixes and makes the line of demarcation between the mixes indistinct. The interchange of binder and the sintering operation binds carbides together very strongly.

When drilling with the insert 10, initially only the wear grade of carbide is in contact with the drilled surface. Not until considerable wear of the wear resistant carbide takes place will the core or inner layer 26 emerge and make contact with the surface being drilled causing the insert to become more shock resistant. This is a very desirable wear condition and prolongs the usable life of the insert.

Figure 6:
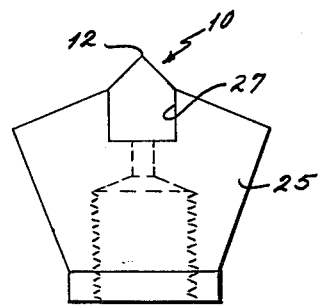

A body 25 of a typical drill bit is shown in FIG. 6 having a channel shaped groove 27 therein for an insert 10. The insert 10 is positioned in the groove 27 with the cutting edge 12 extending outwardly therefrom for engaging a surface to be drilled.

Figure 5:
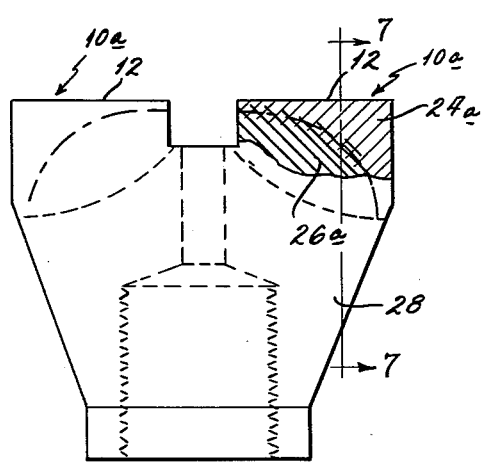

If desired, the body 28 of the drill bit can also be used to close the mold cavity when the insert is formed. If this is done the insert forming materials are fused directly to the body of the bit. An example of this modified construction is shown in FIG. 5, wherein the bit body 28 has two spaced cutting members 10a each formed of two layers 24a and 26a of hard material corresponding to layers 24 and 26 respectively on the insert 10. This modified construction reduces the chance of a fracture occurring between the insert and the bit.

Figure 7:
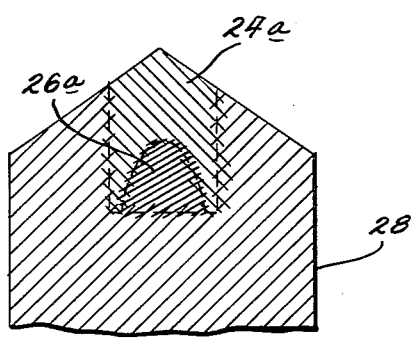
FIG. 7 is a fragmentary cross-section view taken on line 7—7 of FIG. 5.

FIG. 7 is a cross-section view of the bit construction of FIG. 5 and illustrates by the overlapping section lines the relatively indistinct connections between the two grades of carbide material 24a and 26a and between the carbide materials and the bit body 28 itself.

Figure 10:
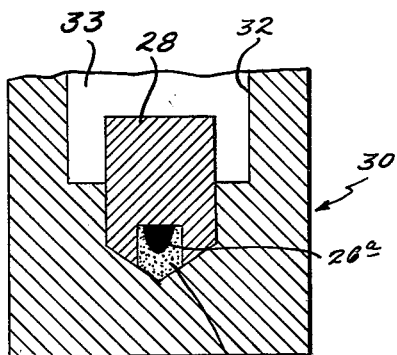
FIG. 10 is another cross-sectional view of the mold of FIG. 8 taken on line 10—10 thereof.
Figure 8:
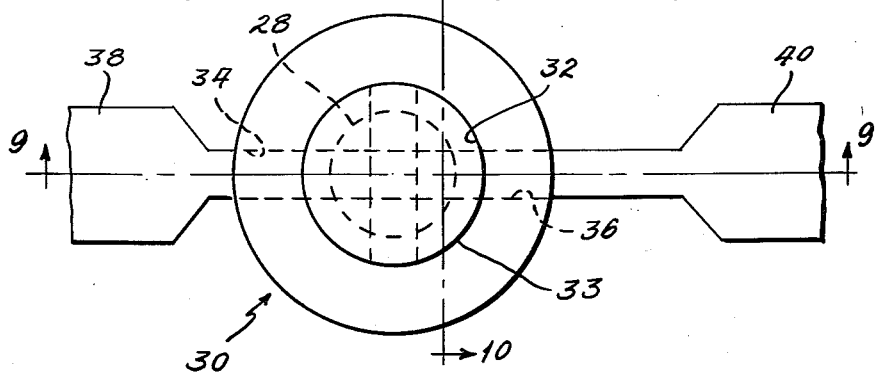
FIG. 8 is a top plan view of a typical mold structure for making the bit of FIGS. 5—7.
Figure 9:
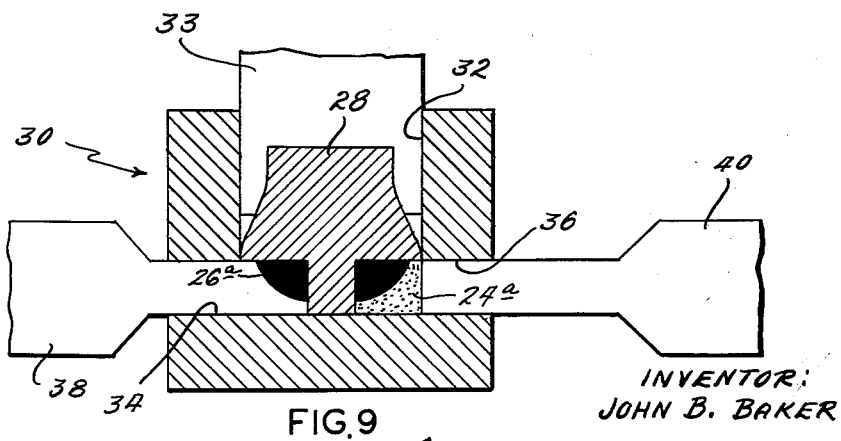
FIG. 9 is a cross-sectional view of the mold of FIG. 8 taken on line 9—9 thereof.

FIGS. 8-10 illustrate a typical structure 30 in which a bit such as the bit of FIGS. 5-7 is made. The structure 30 has an opening 32 which receives and is closed by the body 28 of the bit, and the body 28 is shown being held in the opening by a tool 33 (FIG. 9). The body 28 can have one or more grooves formed in the end thereof for receiving hardened portions, and for illustrative purposes the body shown in the drawings has two such grooves. The structure 30 also has openings 34 and 36 associated with the body grooves into which particles of hard materials are inserted during marking of the bit. The openings 34 and 36 in the structure shown receive tools such as tools 38 and 40 which are used to pack and to give shape to the particles. The tools 38 and 40 may also be used to close the mold. The tool 38 as shown in FIG. 9 is used to form and pack the inner layers of particles 26a, and the tool 40 is used form and pack the outer layers 24a. FIG. 10 shows a cross-scetion view through the mold structure and bit and illustrates a typical arrangement of the particles which is similar to the arrangement of particles in the inserts of FIGS. 1-4. After the hard materials are packed in the mold structure the structure is subjected to predetermined pressure and temperature to solidify the materials and to fuse the materials together and to the body 28. The particular mold structure 30 shown and described herein illustrates one of many possible structures that could be used to form the bit and is not intended to limit the invention to any one particular structure. Furthermore, it is contemplated to use a similar mold structure when making the inserts of FIGS. 1-4.

One of the principal advantages obtained by forming an insert or drill bit in the manner taught by this invention is that it results in an improved wear pattern and a longer bit life. As already pointed out when a drill bit employing one or more of the present inserts is first put into service only the predominantly wear resistant material makes contact with the material being drilled. As the insert wears away its characteristics change from predominantly wear characteristics to more predominantly shock characteristics. This change has certain advantages in prolonging the life of the bit. One reason for this is that the most efficient operation of a bit occurs during the first few uses thereof because closer to 100% of the number of bits are operating and because these bits are in their best cutting condition. In the last few uses, on the other hand, after the bits have been reground several times and are of different sizes and shapes the number of operating bits may have dropped off substantially. By having the predominantly wear resistant layer on the outer surface of the insert, the life of the insert is increased, particularly during the important first few uses, and furthermore a minimum amount of wear takes place during these important first few uses when the inserts are operating at maximum efficiency.

Obviously, in forming the inserts, the thickness of the different grades can be varied and the distribution of the different grades can be proportioned to meet different operating conditions. The present invention is not intended to be limited to particular quantities and distribution or even to particular materials, and the drawings and description are presented for illustrative purposes only.

Even after the insert has worn down a substantial amount and the shock grade tungsten carbide is exposed to the work, some of the wear grade material remains around the periphery of the insert and in contact with the surface being drilled. This also tends to further prolong the life of the insert by preventing too rapid wear of the shock grade material.

The present insert construction has the still further usual advantages provided by a composite insert formed by two or more grades of material having different hardness and wear characteristics. These usual advantages, however, are increased in the present device because of the manner in which the materials are fused together. This is particularly true with respect to the transmission of shocks encountered during drilling from the predominantly wear to the predominantly shock materials. Furthermore, as explained above the fusion of the two grades produced by the interchange of the binder during the sintering makes the line of demarcation between the grades less distinct and eliminates zones of potential fracture. The same is also true to some extent when the inserts are attached directly to the bit by having the bit body close the mold as described in connection with FIG. 5.

Thus it is apparent that there has been provided an insert for a drill bit, such as a rock drill bit, which fulfills all of the objects and advantages sought therefor. Obviously, many changes, modifications and alterations can be made to the present device by those skilled in the art without departing from the spirit and scope of the invention. All such changes, modifications and alterations which do not depart from the spirit and scope of the invention are deemed covered by the invention which is limited only by the claims which follow.

What is claimed:

1. A drill bit comprising a bit body having a longitudinal axis extending between opposite ends of the body, one end of the body having a pair of grooves, each groove disposed on opposite sides of said axis, each groove having a concave bottom surface extending outwardly relative to the axis and sloping toward the other end of the body, an inner non-work engaging layer formed of carbide material in each groove and integrally bonded to the concave surface in the groove, the sides of each inner layer spaced from the sides of its respective groove, the outer end of each inner layer spaced from the outer end of its respective groove, each inner layer having a convex outer surface spaced from said concave bottom surface, an outer exposed layer of carbide material in each groove occupying the remainder of the space therein not occupied by the inner layer and integrally bonded to the surfaces of said groove and inner layer whereby each outer layer completely encloses one of said inner layers, each outer layer having a portion projecting out of its respective groove and formed with a cutting edge normal to said axis, the outer layers of carbide material characterized by being hard and having predominantly wear resistant properties, each inner layer of carbide material being of substantial hardness but less hard than the outer layers and having more resiliency and toughness, a binder material integrally uniting said layers and said body.

2. A drill bit as defined in claim 1, wherein said binder material includes cobalt.

3. A drill bit as defined in claim 1, wherein said outer layer has a radially outer end surface parallel to said axis.

References Cited in the file of this patent

UNITED STATES PATENTS

| | | |
|---|---|---|
| 2,066,853 | Rea | Jan. 5, 1937 |
| 2,578,351 | Griffiths | Dec. 11, 1951 |
| 2,654,573 | Annesley | Oct. 6, 1953 |
| 2,693,725 | Cummins | Nov. 9, 1954 |
| 2,735,656 | Hoglund | Feb. 21, 1956 |
| 2,751,195 | Edstrom et al. | June 19, 1956 |
| 2,777,672 | Haglund et al. | Jan. 15, 1957 |
| 2,889,138 | Haglund | June 2, 1959 |

FOREIGN PATENTS

| | | |
|---|---|---|
| 634,743 | Great Britain | Mar. 29, 1950 |
| 1,126,322 | France | July 23, 1956 |